US011270583B2

(12) United States Patent
Kumar

(10) Patent No.: US 11,270,583 B2
(45) Date of Patent: Mar. 8, 2022

(54) TRAFFIC CONTROL FOR AUTONOMOUS VEHICLES

(71) Applicant: INTERNATIONAL BUSINESS MACHINES CORPORATION, Armonk, NY (US)

(72) Inventor: Keeranoor G. Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 15/822,346

(22) Filed: Nov. 27, 2017

(65) Prior Publication Data

US 2019/0164419 A1 May 30, 2019

(51) Int. Cl.
*G08G 1/09* (2006.01)
*G05D 1/02* (2020.01)
(Continued)

(52) U.S. Cl.
CPC ............ *G08G 1/093* (2013.01); *G05B 15/02* (2013.01); *G05D 1/0088* (2013.01);
(Continued)

(58) Field of Classification Search
CPC .... G08G 1/093; G08G 1/0112; G08G 1/0133; G08G 1/0145; G08G 1/081;
(Continued)

(56) References Cited

U.S. PATENT DOCUMENTS 6,320,515 B1 * 11/2001 Olsson ................ G08G 1/075
340/905
6,496,773 B1 * 12/2002 Olsson .................. G08G 1/01
701/117

(Continued)

FOREIGN PATENT DOCUMENTS

| CN | 106846867 A | 6/2017 |
| DE | 102018129999 A1 | 5/2019 |
| WO | 2016204599 A1 | 12/2016 |

OTHER PUBLICATIONS

Aubert et al., "Toward the Development of a Low-Altitude Air Traffic Control Paradigm for Networks of Small, Autonomous Unmanned Aerial Vehicles," Published Date: Jan. 1, 2015, AIAA Infotech at Aerospace, International Standard Book No. 13 (ISBN-13), Copyright 2015 by the American Institute of Aeronautics and Astronautics, pp. 1-8.

(Continued)

*Primary Examiner* — Jess Whittington
*Assistant Examiner* — Terry C Buse
(74) *Attorney, Agent, or Firm* — Kristofer Haggerty

(57) ABSTRACT

Embodiments of the present invention disclose a method, computer program product, and computer system for traffic control. A computer determines an uncommitted demand and receives a supply pattern from an adjacent downstream node. The computer aggregates the supply pattern with its own supply pattern before propagating the supply pattern to an adjacent upstream node. Moreover, the computer receives a committed demand and demand weight pattern from an (Continued)

upstream node and aggregates the committed demand and demand weight patterns with its own before propagating the aggregated committed demand and demand weight patterns to an adjacent downstream node. The computer further allocates a remaining downstream supply to the uncommitted demand based on weight and detects pending slot position conflicts. Based on detecting a pending slot position conflict, the computer configures a pattern shift and commits the available downstream supply as upstream committed demand. Lastly, the computer weights the unmet uncommitted demand.

15 Claims, 9 Drawing Sheets

(51) Int. Cl.
    *G05D 1/00*     (2006.01)
    *G05B 15/02*     (2006.01)
    *G08G 1/01*     (2006.01)
    *G08G 1/081*     (2006.01)
    *G08G 1/0968*     (2006.01)

(52) U.S. Cl.
    CPC ......... *G05D 1/0287* (2013.01); *G08G 1/0112* (2013.01); *G08G 1/0133* (2013.01); *G08G 1/0145* (2013.01); *G08G 1/081* (2013.01); *G08G 1/096811* (2013.01)

(58) Field of Classification Search
    CPC ............ G08G 1/096811; G05B 15/02; G05D 1/0088; G05D 1/0287
    USPC .......................................................... 701/23
    See application file for complete search history.

(56) References Cited

U.S. PATENT DOCUMENTS

| | | | | |
|---|---|---|---|---|
| 8,520,695 | B1* | 8/2013 | Rubin | G01C 21/3658 |
| | | | | 370/445 |
| 9,536,435 | B1 | 1/2017 | Shay | |
| 9,547,986 | B1 | 1/2017 | Curlander et al. | |
| 9,557,183 | B1 | 1/2017 | Ross et al. | |
| 9,633,560 | B1 | 4/2017 | Gao et al. | |
| 2010/0060482 | A1* | 3/2010 | Emam | G08G 1/096708 |
| | | | | 340/905 |
| 2013/0006464 | A1* | 1/2013 | Speiser | G08G 1/096844 |
| | | | | 701/25 |
| 2013/0139717 | A1* | 6/2013 | Smith | B64F 1/04 |
| | | | | 104/282 |
| 2013/0162445 | A1* | 6/2013 | Bessler | G08C 17/02 |
| | | | | 340/870.3 |
| 2013/0282264 | A1* | 10/2013 | Bastiaensen | G08G 1/0129 |
| | | | | 701/119 |
| 2014/0188376 | A1* | 7/2014 | Gordon | G08G 1/09 |
| | | | | 701/118 |
| 2014/0222321 | A1* | 8/2014 | Petty | G01C 21/3492 |
| | | | | 701/117 |
| 2014/0278052 | A1* | 9/2014 | Slavin | G08G 1/0145 |
| | | | | 701/400 |
| 2014/0316865 | A1* | 10/2014 | Okamoto | G05D 1/0293 |
| | | | | 705/14.1 |
| 2016/0163200 | A1* | 6/2016 | He | G08G 1/22 |
| | | | | 701/117 |
| 2017/0010612 | A1 | 1/2017 | Asakura et al. | |
| 2017/0011633 | A1 | 1/2017 | Boegel | |
| 2018/0096595 | A1* | 4/2018 | Janzen | G06K 9/0063 |
| 2018/0111611 | A1* | 4/2018 | MacNeille | B60W 10/20 |

OTHER PUBLICATIONS

Darroudi, "Variable Speed Limit Strategies to Reduce the Impacts of Traffic Flow Breakdown at Recurrent Freeway Bottlenecks," Florida International University, FIU Digital Commons, FIU Electronic Theses and Dissertations, University Graduate School, Nov. 4, 2014, pp. 1-174.

Stone et al., "Autonomous Intersection Management: Traffic Control for the Future," YouTube, https://www youtube.com/watch?v=4pbAI40dK0A&feature=youtu.be, Published on Jun. 27, 2012, Printed on Jul. 3, 2017, pp. 1-5.

Talebpour et al., "Speed Harmonization: Evaluation of Effectiveness Under Congested Conditions," Article in Transportation Research Record Journal of the Transportation Research Board, Jan. 2013, pp. 69-79.

Wagner, "Traffic Control and Traffic Management in a Transportation System with Autonomous Vehicles," Chapter: Autonomous Driving, Springer for Research & Development, May 22, 2016, pp. 301-316, http://trrjournalonline.trb.org/doi/abs/10.3141/2391-07, Printed on Jul. 3, 2017.

Mell et al., "The NIST Definition of Cloud Computing," National Institute of Standards and Technology, U.S. Department of Commerce, Special Publication 800-145, Sep. 2011, pp. 1-7.

\* cited by examiner

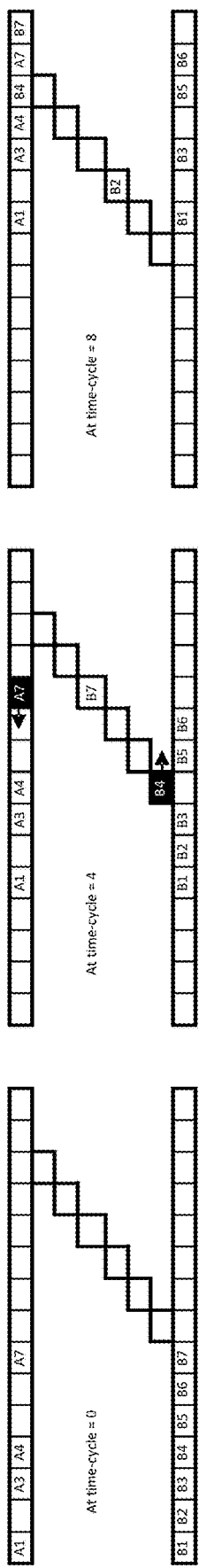
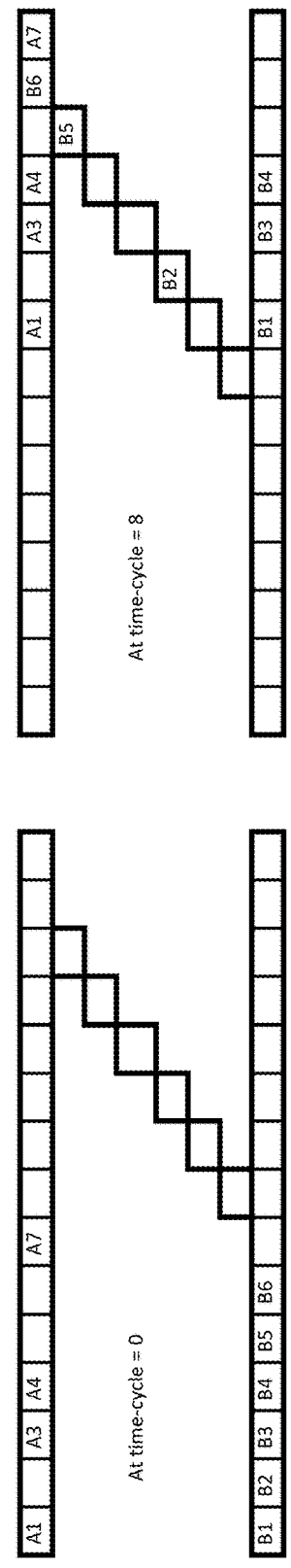
Figure 5A  Figure 5B  Figure 5C
Figure 6A  Figure 6B

TRAFFIC CONTROL FOR AUTONOMOUS VEHICLES

BACKGROUND

The present invention relates generally to autonomous vehicles, and more particularly to autonomous vehicle traffic control.

The state of the art in traffic operations is driven largely by innovations that use statistical techniques to estimate future flow and to predict traffic, such as multi-agent simulation. These techniques, however, are all designed for a traffic operation model that is largely unaware of the arrival time, intended destination, speed, and path of vehicles arriving on the entry ramps and departing off exit ramps of a traffic control network. Moreover, the current state of the art does not yet leverage communication between vehicles and other entities, such as infrastructure, in the network for traffic management. As a result, today's techniques only help in reducing the negative impact of traffic congestion which is regarded as inevitable rather than avoiding congestion in the first place.

SUMMARY

Embodiments of the present invention disclose a method, a computer program product, and a computer system for traffic control of autonomous vehicles. A computer determines an uncommitted demand for a respective node and receives a supply pattern from an adjacent downstream node. The computer aggregates the received supply pattern with its own supply pattern before propagating the supply pattern to an adjacent upstream node. In addition, the computer receives committed demand and demand weight patterns from an upstream node and aggregates the committed demand and demand weight patterns with its own before propagating the aggregated committed demand and demand weight patterns to an adjacent downstream node. The computer further allocates a remaining downstream supply to the uncommitted demand based on the demand weight pattern and detects pending slot position conflicts. Based on detecting a pending slot position conflict, the computer configures a pattern shift and commits the available downstream supply as upstream committed demand. Lastly, the computer weights the unmet uncommitted demand.

BRIEF DESCRIPTION OF THE SEVERAL VIEWS OF THE DRAWINGS

FIGS. 5A-C depict a diagram illustrating the operations of dynamic pattern shifting to avoid a slot position conflict at the merge of a regular node and a connector node, in accordance with an embodiment of the present invention.

FIGS. 6A-B depict a diagram illustrating the merge of a regular node and a connector node at a merge point, in accordance with an embodiment of the present invention.

DETAILED DESCRIPTION

The invention herein presents a solution for regulating the traffic flow in a traffic control network that considers the free flow of vehicles in the network the paramount requirement. This is achieved by maintaining vehicles in an on-ramp queue and allowing entry into the network based on weight. As the demand on the network changes dynamically, the invention re-balances the supply allocation without compromising free flow or fairness. Restated, this solution is proactive in that it prevents traffic congestion from occurring by determining a downstream supply and allocating the downstream supply to upstream demand as needed. Not only does the present invention avoid traffic congestion, it improves critical key performance indicators (KPIs) such as average total travel time per unit distance.

Figure 1:
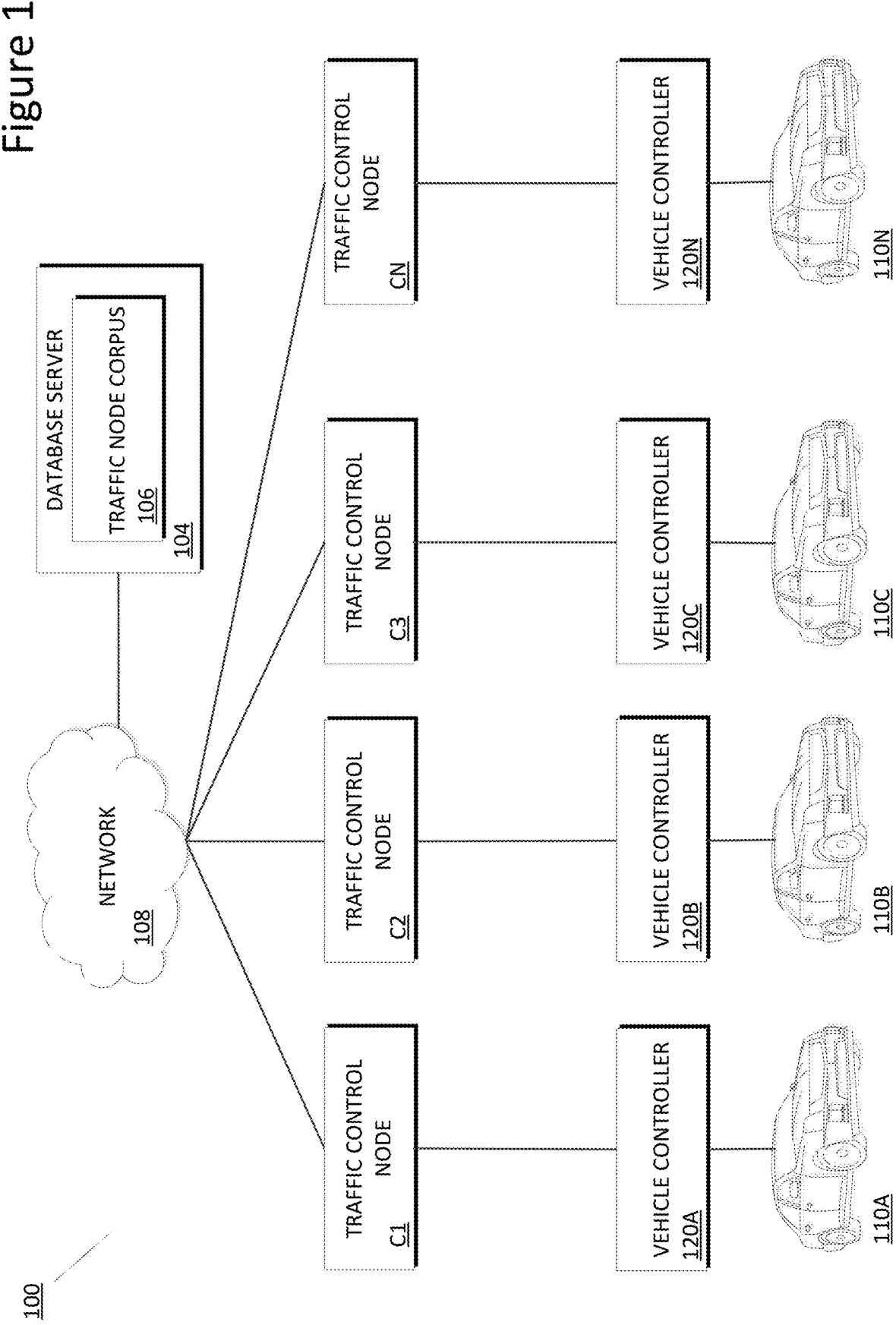
FIG. 1 depicts a schematic diagram illustrating the components of traffic control network 100, in accordance with an embodiment of the present invention.

A traffic control network 100 in accordance with an embodiment of the invention is illustrated by FIG. 1. While the present invention is described in the example embodiment by reference to automobiles, it will be appreciated that the teachings herein are applicable to all vehicles and modes of transport that may experience fluctuations in demand, such as automobiles, trains, aircraft, drones, baggage handling systems, package delivery carriers, etc. Moreover, while some aspects of the present invention are more applicable to autonomous vehicles, it will be appreciated that at least some aspects of the present invention may be applicable to semi and non-autonomous vehicles. In general, the present invention may be applicable to any transportation system having volume fluctuation such as spikes that may cause delays.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. Lastly, such communications may be Dedicated Short Range Communications (DSRC, 5850/5925 MHz) used in vehicle to infrastructure (V2I) and vehicle to vehicle (V2V) communication within the Intelligent Transportation Systems (ITS) connected car program. In general, network 108 can be any combination of connections and protocols that will support communications between traffic control nodes C1-N, vehicle controllers 120A-N, and database server 104.

In the example embodiment, vehicles 110A-N are autonomous automobiles capable of traversing between locations. In the example embodiment, vehicles 110A-N are configured to receive electronic instructions from vehicle controllers 120A-N, respectively, via network 108 in order to operate engines, motors, mechanical actuators, switches, pumps, valves, etc. enabling movement of vehicles 110A-N from various starting locations to ending locations. In the example embodiment, vehicles 110A-N are automobiles, however in other embodiments, may be another form of transportation, including trains, buses, airplanes, drones, conveyer belt bins, and other vehicles used in the transportation of goods and people. Moreover, vehicles 110A-N may be powered and/or moved by gasoline, natural gas, diesel, electricity, hydrogen, pressure, conveyer belt, rail, a hybrid thereof, and other forms of energy or travel. While only vehicles 110A-N are depicted in FIG. 1, it will be appreciated that any number of vehicles may be implemented in the embodiments of traffic control network 100 described herein, denoted by vehicle 110N. Moreover, in the example embodiment, vehicles 110A-N that are in use by a user may be traveling on traffic control network 100 or waiting to enter traffic control network 100 within an on-ramp queue.

In the example embodiment, vehicle controllers 120A-N are computing devices associated with vehicles 110A-N, respectively, that are capable of communicating with traffic control nodes C1-N via network 108. Each of vehicle controllers 120A-N are capable of determining a location of respective vehicles 110A-N via integrated global position system (GPS) modules and transmitting precise location information of vehicles 110A-N to traffic control nodes C1-N. Vehicle controllers 120A-N may further transmit to traffic control nodes C1-N relevant travel information of vehicles 110A-N via integrated accelerometers and gyroscopes, including current GPS coordinates, travel speed, acceleration/deceleration, starting location, ending location, arrival time at on-ramps, departure time, travel duration, and the like. In addition, vehicle controllers 120A-N are capable of receiving instructions from traffic control nodes C1-N and instructing vehicles 110A-N to operate in accordance with the received instructions, such as a designated speed that should be maintained during the next t seconds or the next d miles. In the example embodiment, vehicle controllers 120A-N may be physically and electronically integrated with respective vehicles 110A-N. In other embodiments, however, vehicle controllers 120A-N may be separate entities from vehicles 110A-N and may be any one of a laptop computer, a notebook, a tablet computer, a netbook computer, a personal computer (PC), a personal digital assistant (PDA), a smart phone, a mobile phone, a virtual device, a thin client, or any other electronic device. In such other embodiments, vehicle controllers 120A-N may provide traffic control for many forms of transportation thanks to the portable nature of mobile devices, including use in hybrid transportation networks involving automobiles, trains, planes, etc. Moreover, while only vehicle controllers 120A-N are depicted in FIG. 1, any number of vehicle controllers may be added to traffic control network 100 as needed, denoted by vehicle controller 120N. Vehicle controllers 120A-N are described in greater detail with reference to FIG. 10.

Traffic control nodes C1-N are each computing devices that correspond to and control traffic for a respective physical node of a traffic network. That is, in the example embodiment, each of traffic control nodes C1-N monitor vehicle 110A-N traffic for a physical portion of thruway, transition ramp, on-ramp, on-ramp queue, etc., and thus traffic control network 100 is a contiguous, virtual representative of an actual transportation network. For example, traffic control nodes C1-N may correspond to the roadways of a particular city. Traffic control network 100 is modelled as a set of connected regular nodes and connector nodes forming an acyclic graph, the former being a thruway segment not including any optional on-ramps, off-ramps, merge-ins, and merge-outs that fall within its length, and the latter being a segment of thruway that connects one thruway to another, for example a transition ramp. Each regular node of traffic control nodes C1-N contain a fixed number of vehicle slots, and each regular node in traffic control network 100 will have the same fixed number of vehicle slots. By contrast, connector nodes may have a variable number of vehicle slots. In traffic control network 100, traffic control nodes C1-N are mapped such that each of traffic control nodes C1-N are aware of the relative positions of traffic control nodes C1-N around it. For example and with reference to FIGS. 2/3, traffic control node C12 is configured to be aware of the identity of upstream traffic control node C11, downstream traffic control node C13, and yet further downstream (3 time-cycles, or hops, including its own node) traffic control node C14. In addition, traffic control nodes C1-N are capable of communicating with each other and acting as repeaters to propagate signals across entire traffic control network 100, effectively comprising a mesh network. While only a single vehicle 120A-N is depicted as being connected to each respective traffic control node C1-N for illustrative purposes, it will be appreciated that traffic control nodes C1-N are capable of communication with any number of vehicles and, in the example embodiment, are assumed to each be in communication with one or more vehicles 110 traveling on the n slots that comprise the respective node. Moreover, while only traffic control nodes C1-N are depicted in FIG. 1, any number of traffic control nodes may be added to traffic control network 100 as needed, denoted by traffic control node CN. Traffic control nodes C1-N are described in greater detail with reference to FIGS. 2-9.

Database server 104 includes traffic node corpus 106 and is a computing device configured to store and provide access to large amounts of data. In the example embodiment, database server 104 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data to and from other computing devices. While database server 104 is stored remotely and accessed via network 108 in the example embodiments, database server 104 may be stored and accessed locally in other embodiments. Moreover, although database server 104 is shown as a single device, in other embodiments, database server 104 may be comprised of a cluster or plurality of computing devices, working together or working separately. Database server 104 is described in more detail with reference to FIG. 10.

In the example embodiment, traffic node corpus 106 is a collection of information contained in files, folders, images, videos, audio clips, and other document types detailing the interconnections of traffic control nodes C1-N of traffic control network 100. More specifically, traffic node corpus 106 details traffic control node C1-N features including thruways, on/off-ramps, transition ramps, a number of lanes, lane speeds, a number of slots in each of traffic control nodes C1-N, interconnections of traffic control nodes C1-N, and other network features. In embodiments implementing other autonomous vehicle systems, traffic node corpus 106 may detail, for example, train/bus routes and stops, flights and layovers, baggage/package routing systems, and other networks capable of autonomous traffic control.

Figure 2:
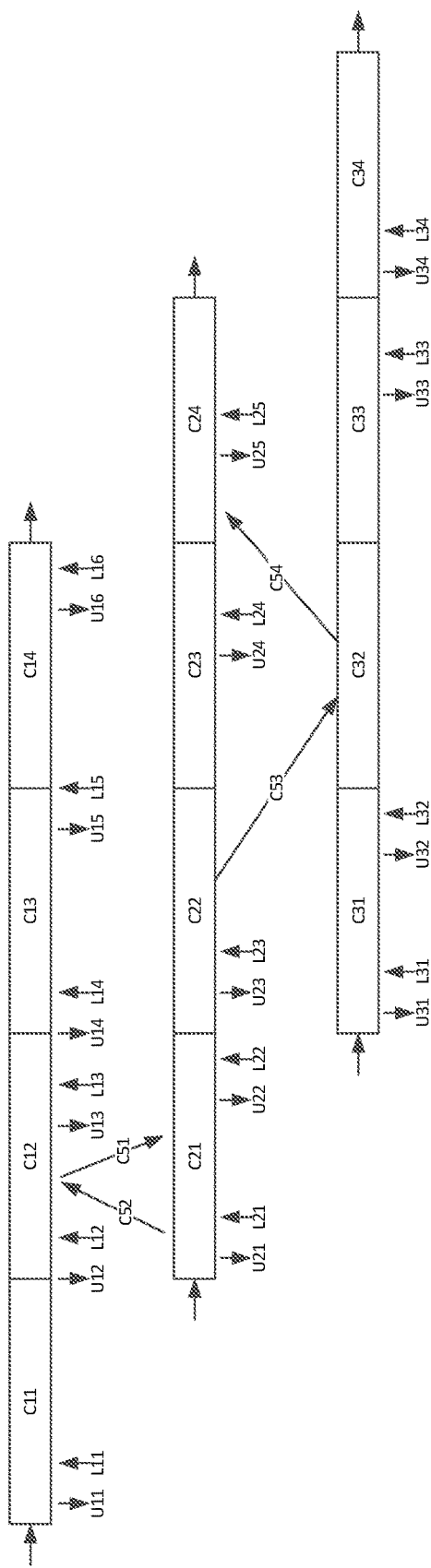
FIG. 2 depicts a diagram illustrating traffic control nodes C1-N of traffic control network 100, in accordance with an embodiment of the present invention.

FIG. 2 depicts a diagram illustrating a configuration of traffic control nodes C1-N of traffic control network 100, in accordance with an embodiment of the present invention. As previously mentioned, traffic control network 100 is modelled as a set of interconnected regular nodes and connector nodes forming an acyclic graph. Traffic control nodes C1-N are arranged sequentially in unidirectional paths known as lanes (traveling from left to right in FIGS. 2 and 3) for vehicles 110A-N. Each of traffic control nodes C1-N comprises one or more slots, wherein a slot is an amount of space along the length of the lane which at any time can contain at-most one of moving vehicles 110A-N. Vehicles 110A-N travel at a defined slot speed associated with the location of the slot they are currently traversing such that one of vehicle 110A-N traveling at the slot speed will completely move from its current slot to the next consecutive slot in a unit of time called the time-step, which is constant across traffic control network 100. That implies the length of any slot is proportional to the defined lane speed at the location of the slot (e.g. the higher the lane speed, the greater the slot length). While slot speeds are defined for the whole network, vehicles 110A-N are permitted to travel at speeds other than the designated slot speed during a pattern shifting operation, which will be described in greater detail with reference to FIGS. 5 and 6.

Traffic control nodes C1-N each comprise a set of N contiguous slots, where N is a pre-determined constant for all regular nodes of the algorithm. Connector nodes, such as transition ramps as depicted in FIG. 2 by diagonal lines C51, C52, etc., each form one of traffic control nodes C1-N. These connector nodes, unlike regular nodes, may have any number of slots, however that number is assumed to be a whole number. When two regular nodes are adjacent on a lane, the time it will take for all the vehicles on the upstream regular node, e.g. C11, to move to the next downstream regular node, e.g. C12, will be called the coordination-time-cycle, or time-cycle (see FIG. 3). Like the time-step, the time-cycle is constant across traffic control network 100.

Figure 3:
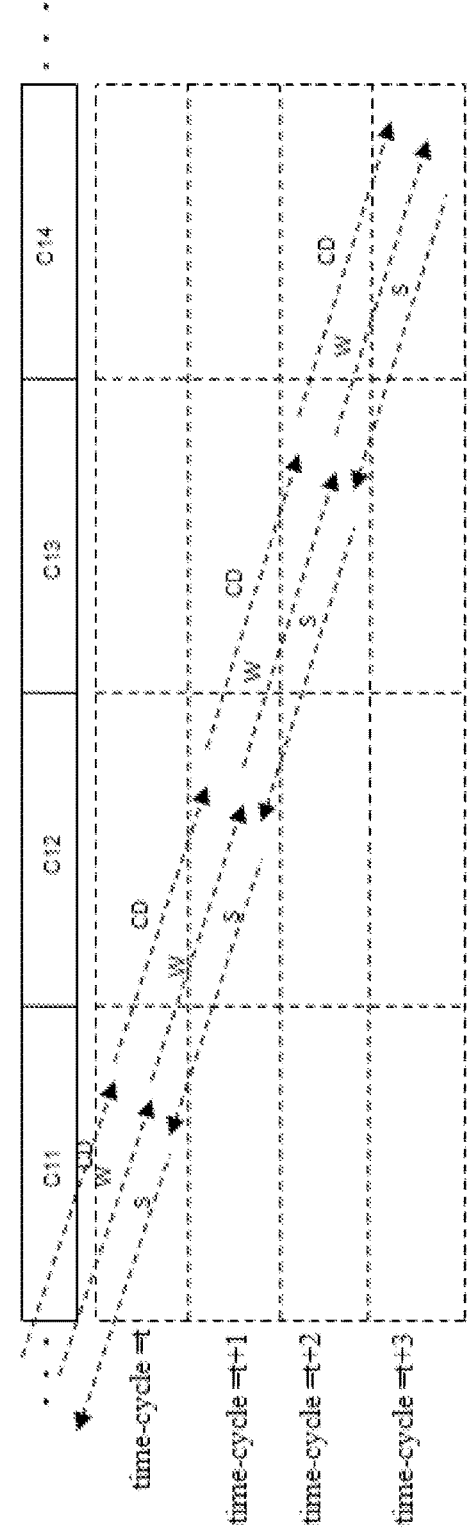
FIG. 3 depicts a diagram illustrating the propagation of a committed demand pattern, a demand weight pattern, and a supply pattern between adjacent traffic control nodes C1-N of traffic control network 100 over the next n time cycles, in accordance with an embodiment of the present invention.
Figure 4:
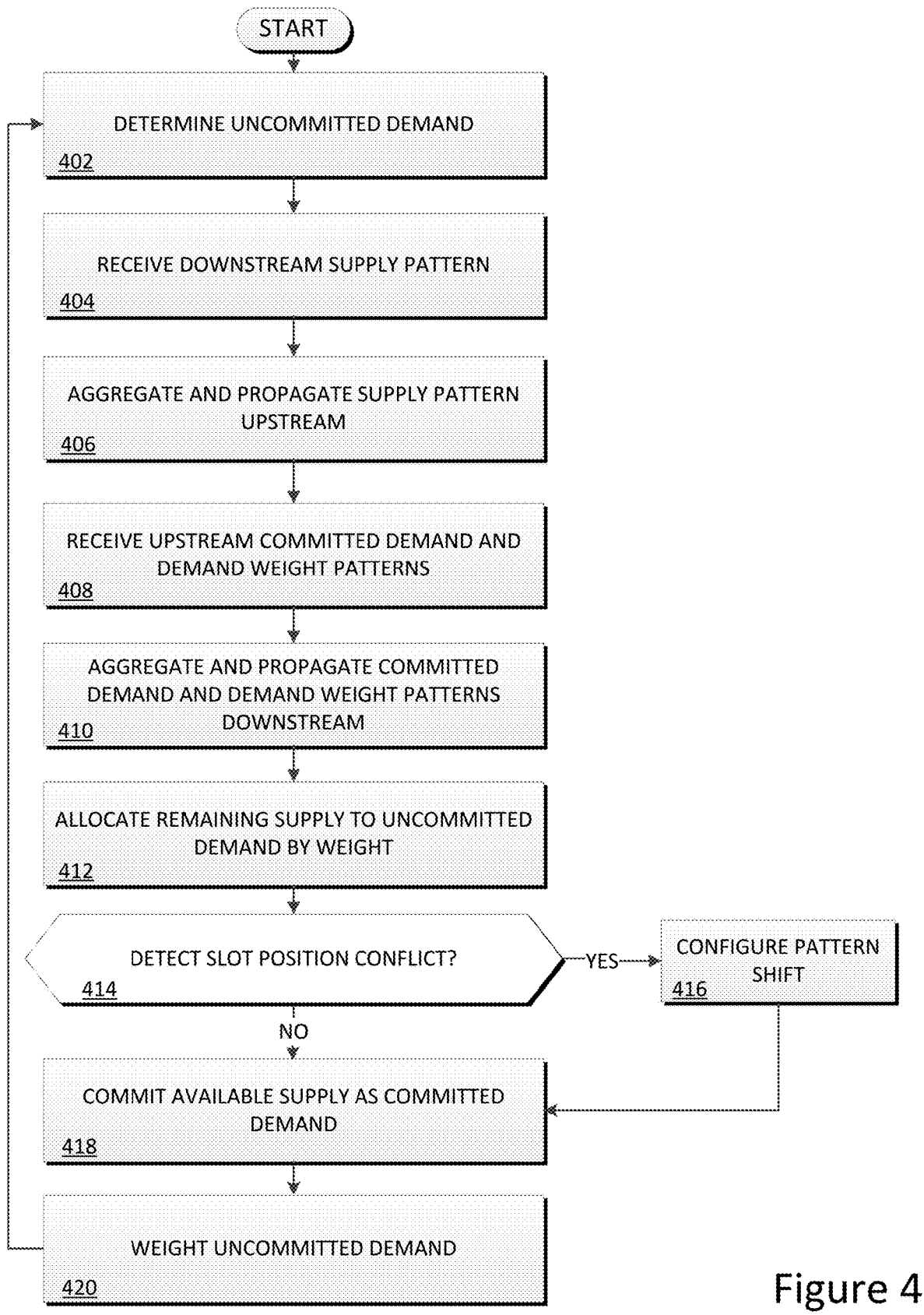
FIG. 4 depicts a flowchart illustrating the operations of traffic control nodes C1-N of traffic control network 100 in controlling autonomous vehicle traffic, in accordance with an embodiment of the present invention.

The operations of traffic controls nodes C1-CN will now be described with reference to FIGS. 2-4. FIG. 3 depicts a diagram illustrating a four-node lane of traffic control network 100 over 4 time cycles (t+1, t+2, etc.) while FIG. 4 depicts a flowchart illustrating the step-by-step operation of traffic control nodes C1-N. In the example embodiment, traffic control nodes C1-N propagate n time-cycles of supply pattern upstream as well as n time-cycles of committed demand and demand weight patterns downstream in a lane. More specifically, an individual traffic control node C1-N receives, aggregates, and propagates a supply pattern received from a downstream traffic control node C1-N n time-cycles upstream. Similarly, the same traffic control node C1-N receives, aggregates, and propagates committed demand and demand weight patterns received from an upstream traffic control node C1-N n time-cycles downstream. If the downstream supply can accommodate the upstream demand, traffic control nodes C1-N allocate the downstream supply to vehicles 110A-N in an on-ramp queue, also known as uncommitted demand. If the upstream demand cannot be met exactly by the downstream supply, then the committed demand undergoes a dynamic pattern shift to accommodate the demand or the supply is allocated to uncommitted demand having a greatest weight. In order to avoid allocate fairly and evenly, uncommitted demand that has not been allocated supply, i.e. remain in the on-ramp queue, have their weights increased based on destination and time having waited. At the next allocation of downstream supply, the uncommitted demand having the greatest weight are once again allocated downstream supply and this strategy is key to avoid starving any of vehicle 110A-N. In the following detailed description, all of traffic control nodes C1-N concurrently perform similar operations relative to adjacent traffic control nodes C1-N. Accordingly, while a single traffic control node C1-N may be referenced for illustrative purposes, for example a subject traffic control node C1-N, it will be appreciated that the operations of the subject traffic control node C1-N are identical to other traffic control nodes C1-N.

Traffic control nodes C1-N determine an uncommitted demand over the next n time-cycles (step 402 of FIG. 4). In the example embodiment, the uncommitted demand comprises both new demand and unfulfilled demand, wherein the new demand comprises vehicles 110A-N entering an on-ramp queue corresponding to the subject traffic control node C1-N during the current time-cycle while unfulfilled demand comprises vehicles 110A-N that have been in the corresponding on-ramp queue for two or more time-cycles. Unfulfilled demand results from the inability of a supply to accommodate a demand and, in order to avoid delays on traffic control network 100, unfulfilled demand are instructed to wait in an on-ramp queue prior to entering traffic control network 100. In the example embodiment, uncommitted demand is weighted corresponding to each destination in traffic control network 100 based on a volume of vehicles waiting to go to that particular destination and increases exponentially with time. For example, the greater the uncommitted demand to travel to a particular exit and the longer the uncommitted demand waits, the greater the weight applied to each of those vehicles 110A-N. In the example embodiment, traffic control nodes C1-N are aware of the uncommitted demand for on-ramps corresponding to a subject traffic control node C1-N based on being the authority for instructing vehicles 110A-N when to enter traffic control network 100. Accordingly, traffic control nodes C1-N determine a respective amount of uncommitted demand based on vehicles 110A-N which have bid to enter vehicle control network 100 for, by example providing information detailing a starting time, a starting location, and an ending location, but have not yet been instructed to enter traffic control network 100. This determination may be further verified using a GPS corresponding to vehicle controller 120A-N. Moreover, based on the received information, traffics control nodes C1-N reference traffic node corpus 106 to determine a route to be taken by vehicles 110A-N as well as a location and a time of entrance/exit into traffic control network 100.

Traffic control nodes C1-N receive a downstream supply pattern over the next n time-cycles (S in FIG. 3, step 404 in FIG. 4). In the example embodiment, the subject traffic control node C1-N receives the supply pattern from an immediately downstream traffic control node C1-N. As used herein, the term pattern is with reference to the slot locations of vehicles 110A-N traveling a particular traffic control node C1-N, as opposed to simply the total number of vehicles 110A-N traveling the particular traffic control node C1-N. By taking into account slot positions, slot position conflicts can later be avoided, as will be described in greater detail with reference to FIGS. 5 and 6. The supply pattern denotes which slots of a traffic control node C1-N are ready to be allocated to the uncommitted demand waiting in on-ramp queues. In the example embodiment, the supply pattern is backward calculated in that the supply pattern is passed from an downstream traffic control node C1-N to an upstream traffic control node C1-N. At the granularity of a slot, the supply pattern includes a precise assignment of path and destination. Moreover, in the example embodiment, the downstream supply pattern further includes the aggregated supply of further consecutive downstream traffic control nodes C1-N. Such supply pattern is aggregated at traffic control nodes C1-N where lanes merge or split, known as supply aggregation points. For example and with reference again to FIG. 2, traffic control node C32 receives supply patterns from traffic control node C33 and traffic control node C54.

Traffic control nodes C1-N aggregates and propagates the supply pattern upstream over the next n time-cycles (S in FIG. 3, step 406 in FIG. 4). In the example embodiment, the downstream supply pattern is received by the subject traffic control node C1-N from an immediately downstream neighbour. The subject traffic control node C1-N then aggregates its own supply from corresponding off-ramps, if any, before propagating the aggregated supply pattern to immediately upstream traffic control nodes C1-N equal to the n time-cycles designated for traffic control network 100. Thus, with reference to FIG. 2, traffic control node C12 aggregates the supply pattern received from traffic control node C13 with a supply pattern corresponding to any off-ramps of traffic control node C12, then propagates the aggregated supply pattern to traffic control node C11. Because FIG. 3 implements a coordination time-cycle of four, a supply pattern originating from traffic control node C13 will be propagated upstream up to traffic control node C10 (not shown). As used herein, the process of aggregating and propagating supply pattern from downstream to upstream traffic control nodes C1-N may be referred to as backward calculation.

Traffic control nodes C1-N receive upstream committed demand and demand weight patterns over the next n time-cycles (CD and W in FIG. 3, step 408 of FIG. 4). In the example embodiment, the subject traffic control node C1-N receives upstream committed demand and demand weight patterns from an immediately upstream traffic control node C1-N. The committed demand pattern comprises vehicles 110A-N which are currently traversing immediately upstream traffic control nodes C1-N of traffic control network 100 while the demand weight patterns comprise vehicles 110A-N of the uncommitted demand in upstream on-ramps, as described above Like the supply pattern, the upstream committed demand and demand weight patterns, in the example embodiment, further include aggregated committed demand and demand weight patterns of further consecutive upstream nodes. For example and with reference to FIG. 2, traffic control node C12 receives committed demand and demand weight patterns from traffic control node C11 and traffic control node C52.

Traffic control nodes C1-N aggregate and propagate the weight and committed demand information downstream over the next n time-cycles (CD and W in FIG. 3, step 410 in FIG. 4). Similar to the propagation of the supply pattern above, traffic control nodes C1-N propagate the committed demand and demand weight patterns to traffic control nodes C1-N n time-cycles away, however unlike the supply pattern which is propagated upstream, the committed demand and demand weight patterns are propagated downstream. In addition, the committed demand and demand weight patterns are modified as they are propagated similar to that of the supply in that the committed demand and demand weight patterns are aggregated by each of traffic control nodes C1-N by which it is propagated. The calculated weights are propagated downstream and associated with traffic control nodes C1-N along the path until reaching a merge point of two or more lanes or branches, at which they are aggregated. Although the weights are aggregated, traffic control node C1-N records the respective weight contribution from each upstream branch for later use in determining the amount of supply to allocate each branch. For example and with reference again to FIG. 2, traffic control node C12 aggregates the committed demand and demand weight patterns received from traffic control node C11 and traffic control node C52, then propagates the information to traffic control node C13. As used herein, the process of aggregating and propagating supply pattern from upstream to downstream traffic control nodes C1-N may be referred to as forward calculation.

Traffic control nodes C1-N allocate remaining supply to uncommitted demand based on weight over the next n time-cycles (step 412). By comparing the supply pattern to the committed demand pattern, traffic control nodes C1-N are capable of determining a remaining supply for the uncommitted demand waiting in on-ramp queues for the subject traffic control node C1-N. In the example embodiment, traffic control nodes C1-N allocate this remaining downstream supply pattern based on the demand weight pattern and weighting system described above. Vehicles 110A-N having greatest weight are prioritized for allocation of the downstream supply and upstream branches having a greatest aggregated weight are allocated a greater portion of the total downstream supply. When allocated supply, vehicles 110A-N are permitted to enter traffic control network 100 and, according to the system described herein, will experience no delays or traffic until exiting traffic control network 100 at an off-ramp.

Traffic control nodes C1-N detect a pending slot position conflicts over the next n time-cycles (decision 414). A slot position conflict situation occurs when supply patterns are merged and the elements of the merging patterns carrying the highest weights are picked. A slot position conflict is said to occur when two occupied slots merge into a single downstream slot at a merge point, thereby displacing a vehicle 110A-N. In the example embodiment, traffic control nodes C1-N use the concept of time-cycles such that all vehicles 110A-N move at a defined and predictable rate. This allows for traffic control nodes C1-N to determine well in advance, i.e. at least n time-cycles, whether a merge point may cause what is known as a slot position conflict. In the example embodiment, slot position conflicts are resolved by determining whether vehicles 110A-N that are calculated to be in conflict can be accelerated or decelerated to occupy an adjacent slot in order to avoid conflict.

Figure 7A:
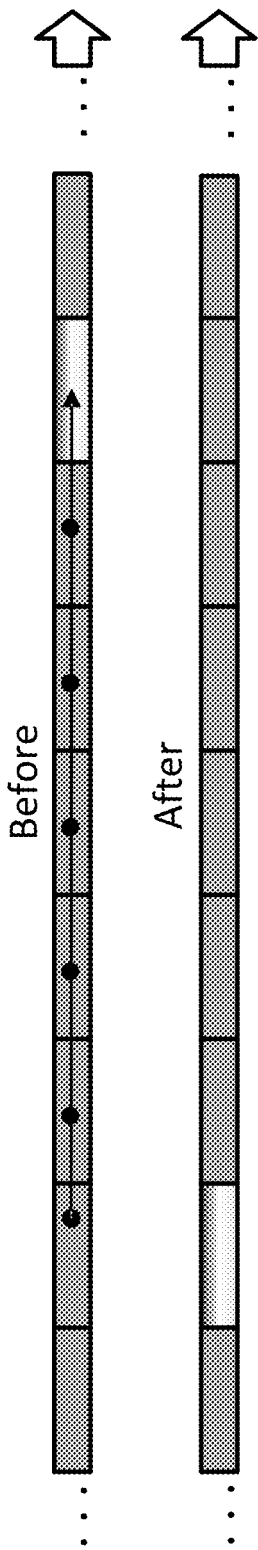
FIGS. 7A and 7B depict a diagram illustrating empty slot propagation in both backward and forward propagation, in accordance with an embodiment of the present invention.
Figure 7B:
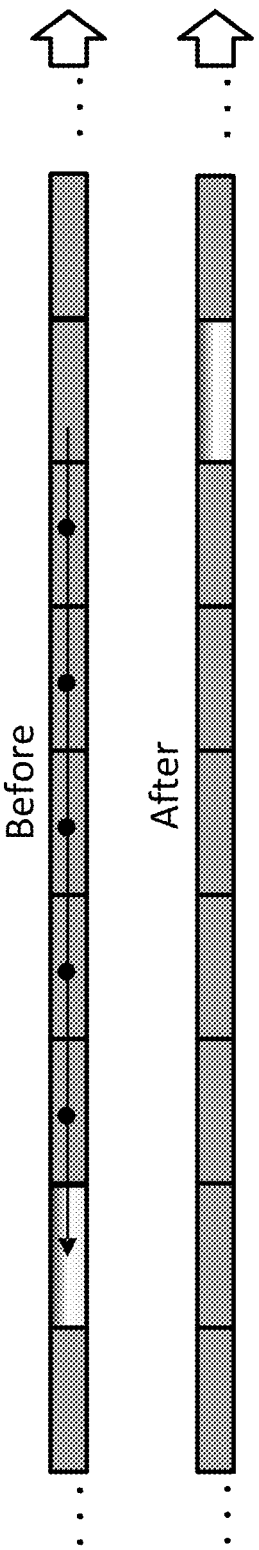

If traffic control nodes C1-N detect a slot position conflict (decision 414 "YES" branch), then traffic control nodes C1-N configure a pattern shift (step 416). In the example embodiment, and as depicted by FIGS. 5A-C, a pattern shift involves the acceleration or deceleration of a vehicle 110A-N traveling on traffic control network 100 in order to move to an adjacent, unoccupied slot and accommodate another vehicle 110A-N at a merge point. The process of empty slot propagation is further illustrated by FIG. 7 wherein FIG. 7A illustrates backward propagation and FIG. 7B illustrates forward propagation. In the example embodiment, the acceleration or deceleration is performed across as many slots as possible such that any single vehicle 110A-N experiences as little acceleration or deceleration as possible. FIGS. 5A-C depict two horizontal, regular nodes and a diagonal connector node at time-cycle 0, 4, and 8. As depicted by FIGS. 5A-C, vehicles 110A-N of slots A7 and B7 are scheduled to conflict at time-cycle 8. Similarly, vehicles 110A-N of slots A4 and B4 are scheduled to conflict at time-cycle 10. Accordingly, by decelerating vehicle 110A-N of slot A7 and accelerating vehicle 110A-N of slot B4, both conflicts can be avoided in advance. Importantly, such shifting of slot position of vehicle 110A-N, known as dynamic pattern shifting, involves making sure that the shift does not adversely affect downstream merges and allocations that have been previously computed for committed demand. If the conflict cannot be handled, the system falls back on the weights associated with the conflicting vehicles 110A-N to prioritize the vehicles that must be allocated the supply and have the others wait in the queue.

If traffic control nodes C1-N fail to detect a slot position conflict (decision 414 "NO" branch and depicted by FIGS. 6A-B), or following a pattern shift configuration (step 416), then traffic control nodes C1-N commit the downstream supply to the uncommitted demand in accordance with the previously determined allocation, including any dynamic pattern shifting (step 418). This process entails converting the downstream supply into committed demand at the end of this time-cycle (iteration) for the purposes of iterating the herein steps. In forthcoming iterations, the once determined downstream supply is now considered upstream committed demand and the once uncommitted demand is instructed to enter traffic control network 100 at the appropriate time-cycle.

Traffic control nodes C1-N weights any unmet uncommitted demand (step 420). If the upstream demand pattern exceeds the downstream supply pattern, there will be remaining uncommitted demand which is not permitted to enter traffic control network 100 from an on-ramp queue. Based on the weighting system described above, these vehicles 110A-N are weighed such that in next iterations, they have a higher priority for entering traffic control network 100. In the example embodiments, weights are destination based and factor in both a volume of vehicles 110A-N traveling to a particular destination as well as an amount of time vehicles 110A-N have waited.

The process enumerated above is repeated iteratively by every traffic control node C1-N in traffic control network 100 at every time-cycle for as long as needed and, potentially perpetually. In traffic control network 100, every traffic control node C1-N are performing computations that will help it determine allocations for vehicles 110A-N that are waiting at on-ramps within its jurisdiction as well as computations to help a few traffic control nodes C1-N behind it do the same. These computations are performed at maximum concurrency whilst communicating node-to-node. To reduce computational load during runtime, traffic control network 100 includes a pre-processing step which is performed at time of traffic control network 100 initialization which converts all network definition data contained in traffic node corpus 106 into static data that can be used to reduce run-time computations. The static data is preserved in every traffic control node C1-N and only changes if the network definitions change.

Figure 8:
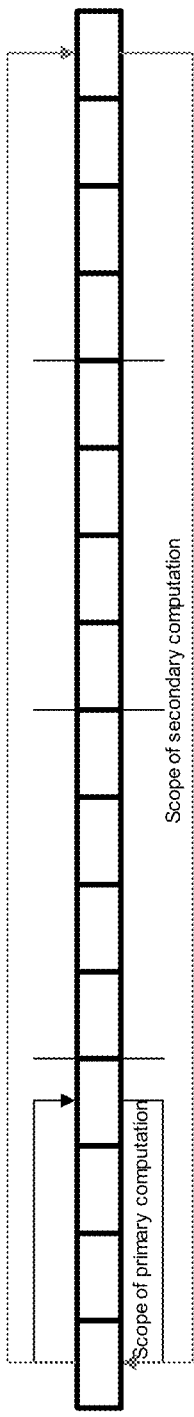
FIG. 8 depicts a diagram illustrating primary and secondary computations made by traffic control nodes C1-N, in accordance with an embodiment of the present invention.
Figure 9:
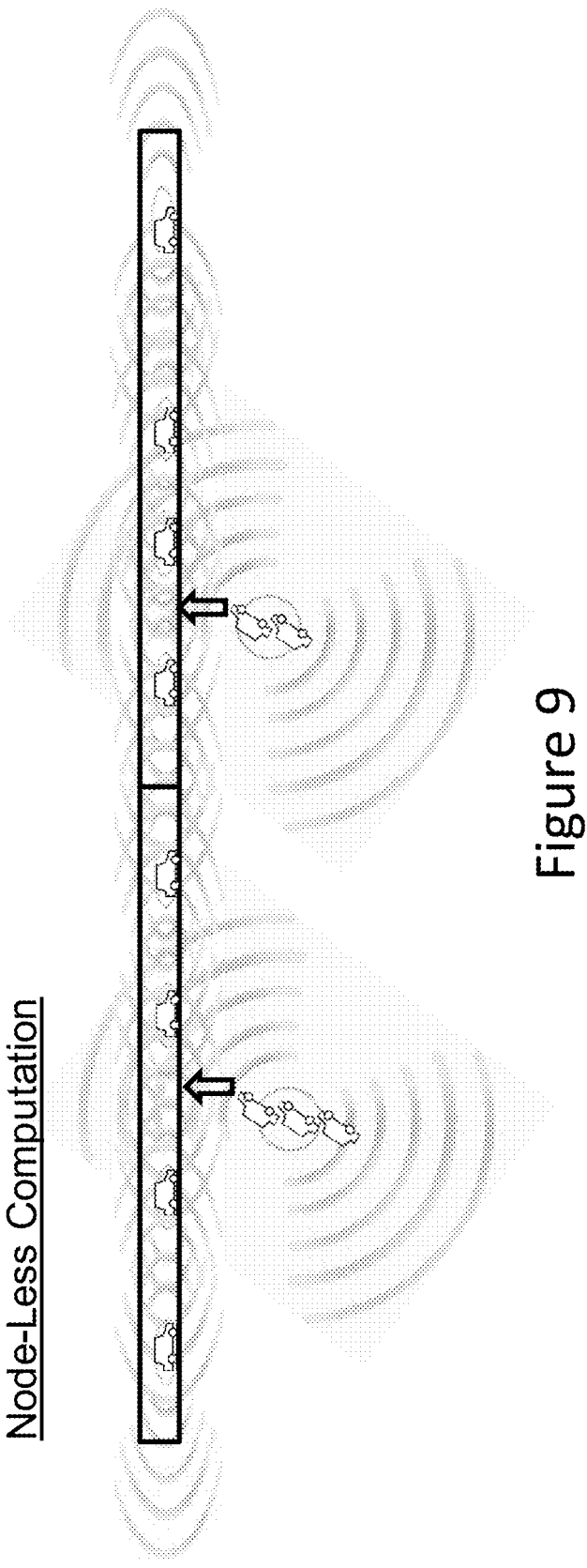
FIG. 9 depicts the operations of an embodiment in which vehicle controllers 120A-N perform the operations of traffic control nodes C1-N, in accordance with an embodiment of the present invention.

While the primary computation during a time-cycle is the supply allocation at each of traffic control node C1-N during each time-cycle, traffic control nodes C1-N perform a secondary computation, as illustrated by FIG. 8, during the time in which vehicles 110A-N are traveling from node to the next. The computation focuses on carrying demand information much further downstream than n hops and supply pattern much further upstream than n hops. This process is intended to help traffic control network 100 have a more extensive awareness of future demand to eliminate exceptions from demand spikes.

In some embodiments of the present invention, the operations of traffic control nodes C1-N may be assumed by vehicle controllers 120A-N of vehicles 110A-N which are in a respective traffic control node C1-N jurisdiction. In such embodiments, vehicle controllers 120A-N implement the operations of a single traffic control node C1-N as a distributed computing network in that each vehicle controller 120A-N becomes a subnode in direct communication with other subnodes that computes its own behaviour as well as aids in computing the behaviour of those subnodes around it.

Figure 10:
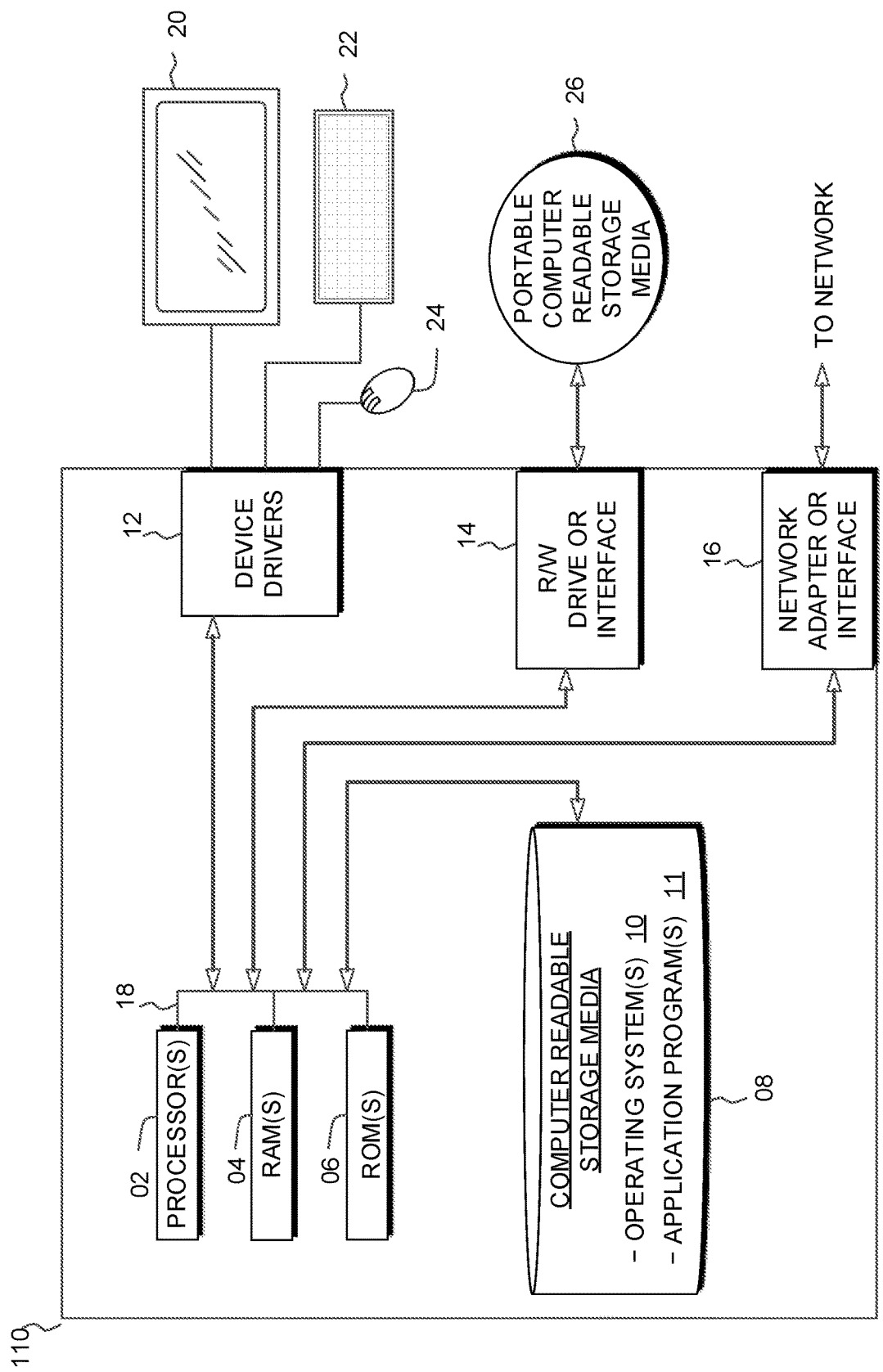
FIG. 10 is a block diagram depicting the hardware components of traffic control network 100 of FIG. 1, in accordance with an embodiment of the present invention.

FIG. 10 depicts a block diagram of computing devices utilized by traffic control network 100 of FIG. 1, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example traffic control node C11, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
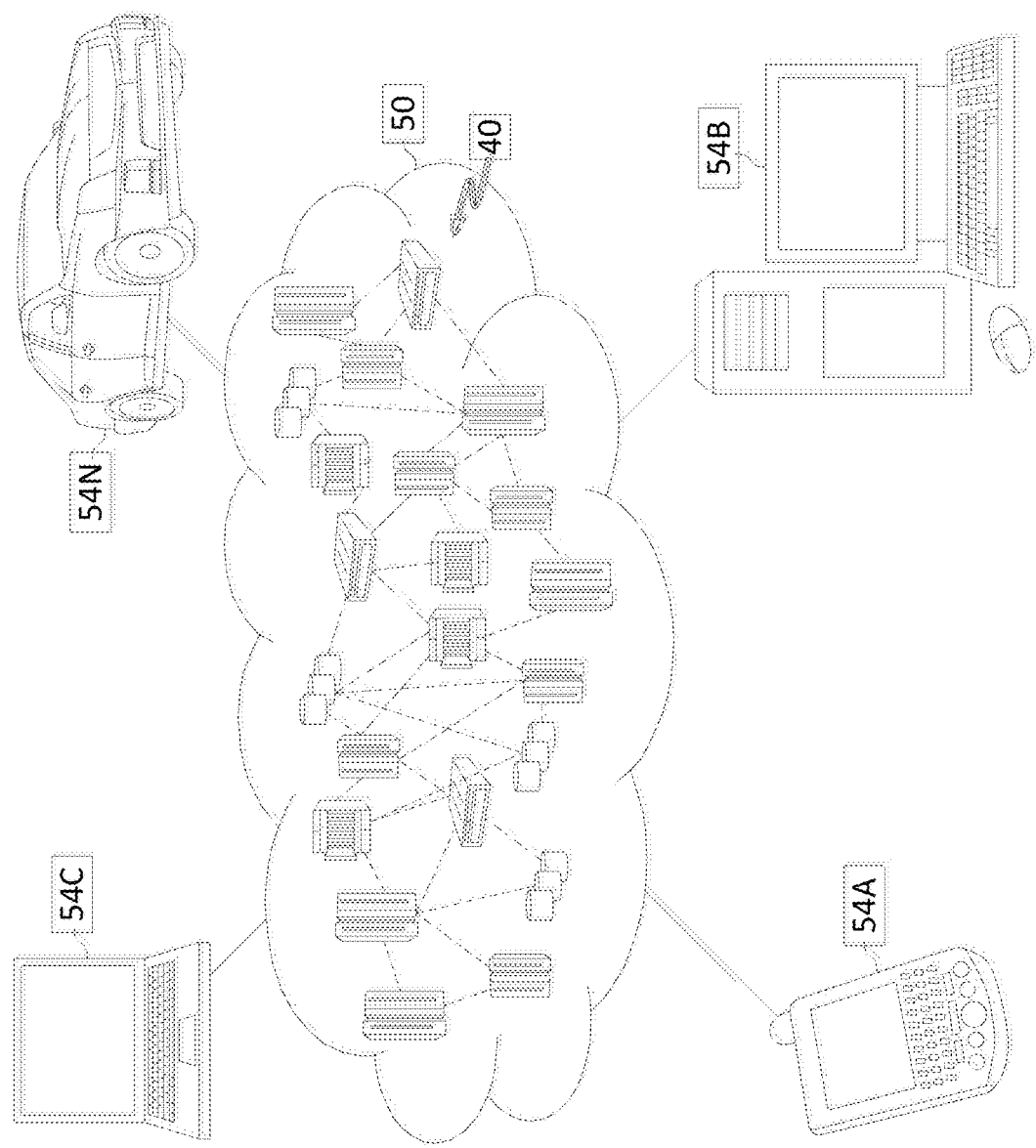
FIG. 11 depicts a cloud computing environment, in accordance with an embodiment of the present invention.

Referring now to FIG. 11, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 40 and cloud computing environment 50 can communicate with any type of computerized device over any type of network and/or network addressable connection (e.g., using a web browser).

Figure 12:
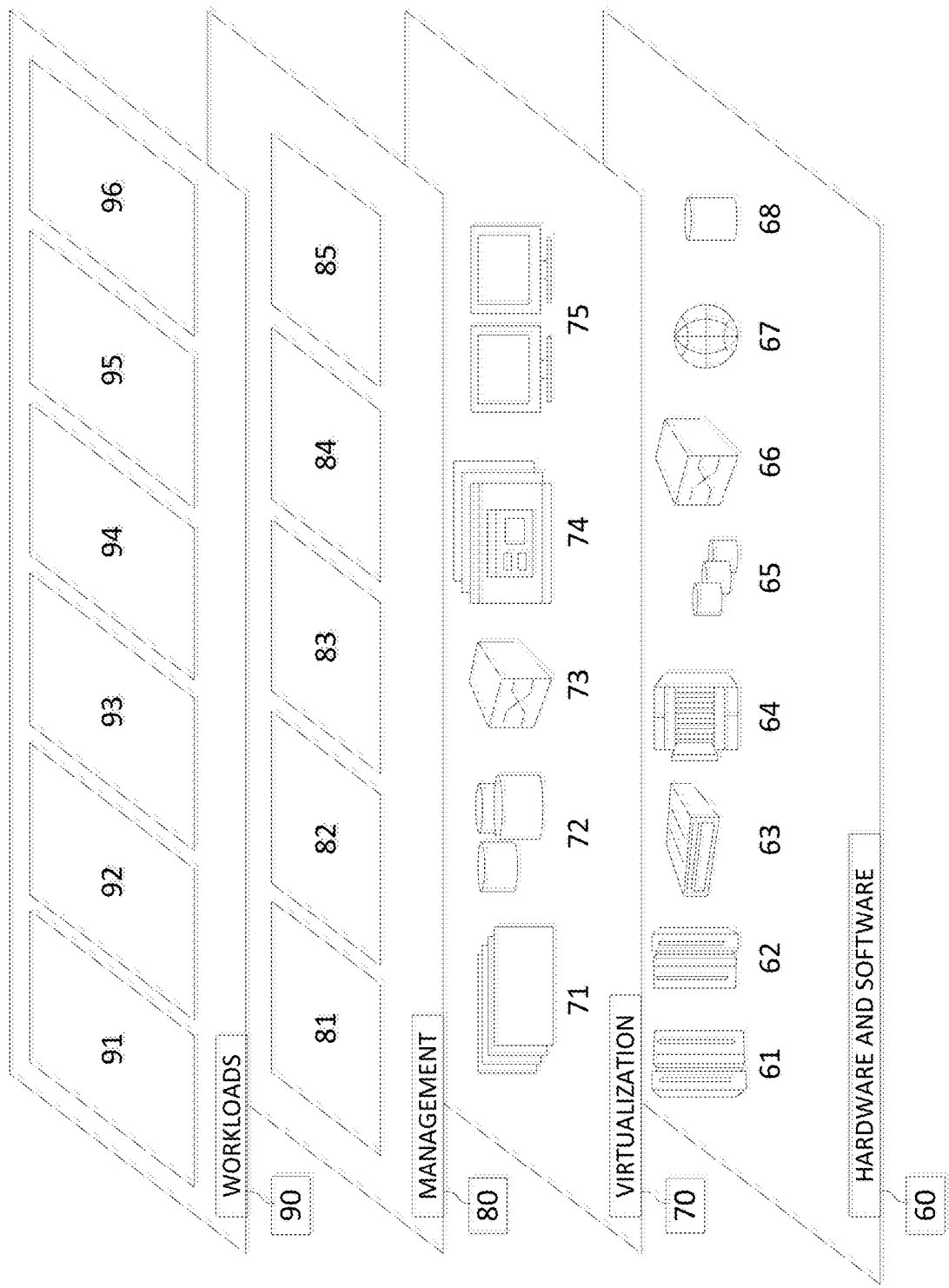
FIG. 12 depicts abstraction model layers, in accordance with an embodiment of the present invention.

Referring now to FIG. 12, a set of functional abstraction layers provided by cloud computing environment 50 (FIG. 4) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic control processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling autonomous vehicles within a traffic control network, the method comprising:
    a computer associated with a node of one or more nodes determining an uncommitted demand pattern for the node detailing one or more vehicles waiting in an on-ramp corresponding to the node;
    the computer receiving a supply pattern from one or more nodes downstream of the node detailing one or more slots that are unoccupied;
    the computer receiving a committed demand pattern detailing one or more slots that are occupied and a weight demand pattern detailing one or more vehicles waiting in an on-ramp corresponding to and from one or more nodes upstream of the node;
    the computer determining whether the supply pattern exceeds the committed demand pattern;
    based on the determining that the supply pattern exceeds the committed demand pattern, the computer allocating the excess supply pattern to the uncommitted demand pattern based on the weight demand pattern;
    the computer detecting a slot position conflict in one or more slots of the one or more nodes;
    the computer determining whether a slot of the one or more slots within a threshold distance of the slot position conflict is unoccupied;
    based on determining that the slot of the one or more slots within the threshold distance of the slot position conflict is unoccupied, the computer modifying one or more slot speeds of the one or more slots to occupy the slot and accommodate the at least one of the uncommitted demand pattern and weight demand pattern;
    the computer aggregating the excess supply pattern into the committed demand pattern; and
    based on the determining that the supply pattern does not exceed the committed demand pattern, the computer weighting the uncommitted demand pattern exponentially based on a wait time.

2. The method of claim 1, wherein weighting the uncommitted demand pattern is further based on a destination.

3. The method of claim 1, wherein receiving the supply pattern from the one or more nodes downstream of the node further comprises:
    the computer splitting the received supply pattern; and
    the computer propagating the split supply pattern to the one or more upstream nodes.

4. The method of claim 1, wherein receiving the committed demand pattern and the weight demand pattern from the one or more nodes upstream of the node further comprise:
    the computer aggregating the received committed demand pattern and the weight demand pattern, respectively; and
    the computer propagating the aggregated committed demand pattern and the aggregated weight demand pattern to the one or more downstream nodes.

5. The method of claim 1, wherein operations of the computer associated with the node are instead performed by one or more vehicles occupying one or more slots of the node as a distributed computing network.

6. A computer program product for controlling autonomous vehicles within a traffic control network, the computer program product comprising:
    one or more computer-readable storage media and program instructions stored on the one or more computer-readable storage media, the program instructions comprising:

program instructions to determine an uncommitted demand pattern for a node of one or more nodes detailing one or more vehicles waiting in an on-ramp corresponding to the node;
program instructions to receive a supply pattern from one or more nodes downstream of the node detailing one or more slots that are unoccupied;
program instructions to receive a committed demand pattern detailing one or more slots that are occupied and a weight demand pattern detailing one or more vehicles waiting in an on-ramp corresponding to and from one or more nodes upstream of the node;
program instructions to determine whether the supply pattern exceeds the committed demand pattern;
based on the determining that the supply pattern exceeds the committed demand pattern, program instructions to allocate the excess supply pattern to the uncommitted demand pattern based on the weight demand pattern;
program instructions to detect a slot position conflict in one or more slots of the one or more nodes;
program instructions to determine whether a slot of the one or more slots within a threshold distance of the slot position conflict is unoccupied;
based on determining that the slot of the one or more slots within the threshold distance of the slot position conflict is unoccupied, program instructions to modify one or more slot speeds of the one or more slots to occupy the slot and accommodate the at least one of the uncommitted demand pattern and weight demand pattern;
program instructions to aggregate the excess supply pattern into the committed demand pattern; and
based on the determining that the supply pattern does not exceed the committed demand pattern, program instructions to weight the uncommitted demand pattern exponentially based on a wait time.

7. The computer program product of claim 6, wherein the program instructions to weight the uncommitted demand pattern is further based on a destination.

8. The computer program product of claim 6, wherein the program instructions to receive the supply pattern from the one or more nodes downstream of the node further comprises:
program instructions to split the received supply pattern; and
program instructions to propagate the split supply pattern to the one or more upstream nodes.

9. The computer program product of claim 6, wherein the program instructions to receive the committed demand pattern and the weight demand pattern from the one or more nodes upstream of the node further comprise:
program instructions to aggregate the received committed demand pattern and the weight demand pattern, respectively; and
program instructions to propagate the aggregated committed demand pattern and the aggregated weight demand pattern to the one or more downstream nodes.

10. The computer program product of claim 6, wherein operations of the computer program product are performed by one or more vehicles occupying one or more slots of the node as a distributed computing network.

11. A computer system for controlling autonomous vehicles within a traffic control network, the computer system comprising:
one or more computer processors, one or more computer-readable storage media, and program instructions stored on one or more of the computer-readable storage media for execution by at least one of the one or more processors, the program instructions comprising:
program instructions to determine an uncommitted demand pattern for a node of the one or more nodes detailing one or more vehicles waiting in an on-ramp corresponding to the node;
program instructions to receive a supply pattern from one or more nodes downstream of the node detailing one or more slots that are unoccupied;
program instructions to receive a committed demand pattern detailing one or more slots that are occupied and a weight demand pattern detailing one or more vehicles waiting in an on-ramp corresponding to and from one or more nodes upstream of the node;
program instructions to determine whether the supply pattern exceeds the committed demand pattern;
based on the determining that the supply pattern exceeds the committed demand pattern, program instructions to allocate the excess supply pattern to the uncommitted demand pattern based on the weight demand pattern;
program instructions to detect a slot position conflict in one or more slots of the one or more nodes;
program instructions to determine whether a slot of the one or more slots within a threshold distance of the slot position conflict is unoccupied;
based on determining that the slot of the one or more slots within the threshold distance of the slot position conflict is unoccupied, program instructions to modify one or more slot speeds of the one or more slots to occupy the slot and accommodate the at least one of the uncommitted demand pattern and weight demand pattern;
the computer aggregating the excess supply pattern into the committed demand pattern; and
based on the determining that the supply pattern does not exceed the committed demand pattern, program instructions to weight the uncommitted demand pattern exponentially based on a wait time.

12. The computer system of claim 11, wherein the program instructions to weight the uncommitted demand pattern is further based on a destination.

13. The computer system of claim 11, wherein the program instructions to receive the supply pattern from the one or more nodes downstream of the node further comprises:
program instructions to split the received supply pattern; and
program instructions to propagate the split supply pattern to the one or more upstream nodes.

14. The computer system of claim 11, wherein the program instructions to receive the committed demand pattern and the weight demand pattern from the one or more nodes upstream of the node further comprise:
program instructions to aggregate the received committed demand pattern and the weight demand pattern, respectively; and
program instructions to propagate the aggregated committed demand pattern and the aggregated weight demand pattern to the one or more downstream nodes.

15. The computer system of claim 11, wherein operations of the computer system are performed by one or more vehicles occupying one or more slots of the node as a distributed computing network.

* * * * *